United States Patent [19]

Schmidt

[11] Patent Number: 4,759,274
[45] Date of Patent: Jul. 26, 1988

[54] COFFEE MAKER

[75] Inventor: Heinrich Schmidt, Porta Westfalica, Fed. Rep. of Germany

[73] Assignee: Melitta-Werke Bentz & Sohn, Minden, Fed. Rep. of Germany

[21] Appl. No.: 941,172

[22] Filed: Dec. 12, 1986

[30] Foreign Application Priority Data

Dec. 14, 1985 [DE] Fed. Rep. of Germany ... 8535291[U]

[51] Int. Cl.⁴ ............................................. A47J 31/24
[52] U.S. Cl. ........................................ 99/295; 99/285; 99/299; 99/302 R
[58] Field of Search ...................... 99/295, 300, 302 R, 99/302 P, 285, 279, 307, 299, 282, 285; 429/433

[56] References Cited

U.S. PATENT DOCUMENTS 3,217,923 11/1965 Price ..................................... 99/285
3,278,087 10/1966 Stasse ................................ 99/302 R
3,423,209 1/1969 Weber ................................... 99/307

Primary Examiner—Robert W. Jenkins
Attorney, Agent, or Firm—Spencer & Frank

[57] ABSTRACT

A coffee maker includes a housing which supports a fresh water container above a receptacle for the coffee. A resistive heating element is mounted in the container to heat the water. The bottom of the container is provided by a downwardly sloping element having an outlet to release heated water to a filter vessel which is releasably connected to the bottom element by a bayonet lock. The filter vessel has an upper rim which is pressed toward an annular shoulder on the underside of the bottom element to create a seal, so that a bubble forms beneath the bottom element when coffee is being brewed. The upper side of the bottom element has arms which mount a temperature-sensitive bimetallic snap element over the outlet. A resilient stopper is mounted on the snap element and is raised from the outlet by the snap element when the water is hot enough for coffee.

13 Claims, 5 Drawing Sheets

FIG. 4
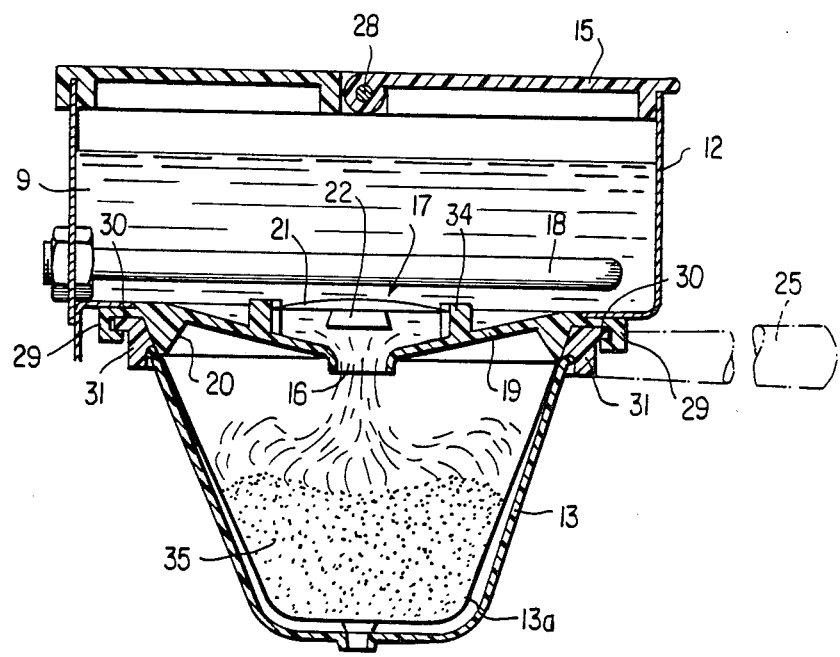
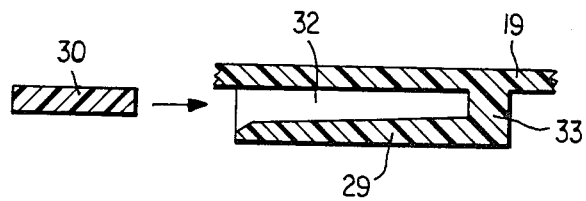
FIG. 6

COFFEE MAKER

BACKGROUND OF THE INVENTION

1. Field of the Invention

The present application relates to a coffee maker for making filtered coffee, and more particularly to a coffee maker of the type which includes a fresh water container having a lower outlet opening, a heating assembly for heating the fresh water, a filter vessel for accommodating a filter paper insert, and a receptacle for the filtered coffee disposed below the filter vessel.

2. Discussion of the Prior Art

Coffee makers of this type are known per se.

In the prior art coffee makers, a flow-type heater is used to heat the fresh water, with such flow-type heaters operating according to the gravity principle. In these devices, the fresh water is supplied from the fresh water container to the flow-type heater, which is disposed below the outlet opening of the fresh water container. The water is heated and then conducted into the filter vessel through a riser pipe and an overflow conduit. Prior art coffee makers of this type are in general use today and are quite satisfactory in meeting the demands put upon them.

Independently of their specific configurations, however, all these coffee makers have one problem in common. This problem is that the customary flow-type heaters are unable to convey the fresh water very quickly into the filter vessel. As a related matter, however, it should be noted that in conventional coffee makers the speed at which the brewing water is conveyed should not be too fast. Otherwise a danger would exist that the filter vessel might overflow, since the capacity of the filter vessel is normally considerably less than that of the associated fresh water container.

A further basic drawback of conventional coffee makers is that the water, as soon as it flows into the filter vessel, more or less quickly cools of again depending on the ambient temperature.

SUMMARY OF THE INVENTION

It is an object of the present invention to provide a coffee maker of this type which, with a simple structural configuration, makes it possible to convey large quantities of hot water into the filter vessel and to keep this water at a high temperature.

This is accomplished, in a coffee maker of the type discussed above, by the following features:

(a) the fresh water container is disposed above the filter vessel;

(b) the heating assembly is disposed within the fresh water container and is composed of one or a plurality of heating rods, heating coils, or the like;

(c) the filter vessel is releasably connected with the fresh water container;

(d) the fresh water container and filter vessel are sealed against one another in the area where they are connected; and (e) the outlet of the fresh water container is provided with a movable closing member.

A coffee maker of this configuration has several advantages over the prior art. On the one hand, the housing structure can be relatively simple since, due to the fact that the fresh water is heated by a heating assembly disposed directly within the fresh water container, the flow-type heater can be eliminated.

Another advantage of the novel coffee maker is that, after the fresh water has been heated in the fresh water container and after the closing member in the region of the outlet of the fresh water container has been opened, a comparatively large quantity of heated water flows into the filter vessel within a short period of time. The effect of flash brewing is utilized here, which is comparable with manually pouring hot water from a kettle into a filter vessel as is done when coffee is brewed "manually."

Another advantage of the coffee maker according to the invention is that, after the closing member is opened, the fresh water container and the filter vessel in practice form a common vessel for the brewing water in the region of the outlet of the fresh water container. Since a heating assembly is provided in the fresh water container, the possibility exists of heating the brewing water until it falls below the level of the heating assembly. In this way, it is assured that the brewing water passing through the filter container always has a relatively high temperature so that the filtered coffee also has a relatively high temperature.

Under certain circumstances, this measure even permits the elimination of the known heating plate for the filtered coffee receptacle.

BRIEF DESCRIPTION OF THE DRAWINGS

FIG. 4 is a sectional view corresponding to a portion of FIG. 3, and shows the fresh water container and the filter vessel after the outlet of the fresh water container has been opened.

FIG. 6 is a sectional view illustrating a bayonet tongue approaching a bayonet socket to join the filter vessel to the bottom element of the water container.

DESCRIPTION OF THE PREFERRED EMBODIMENT

Figure 1:
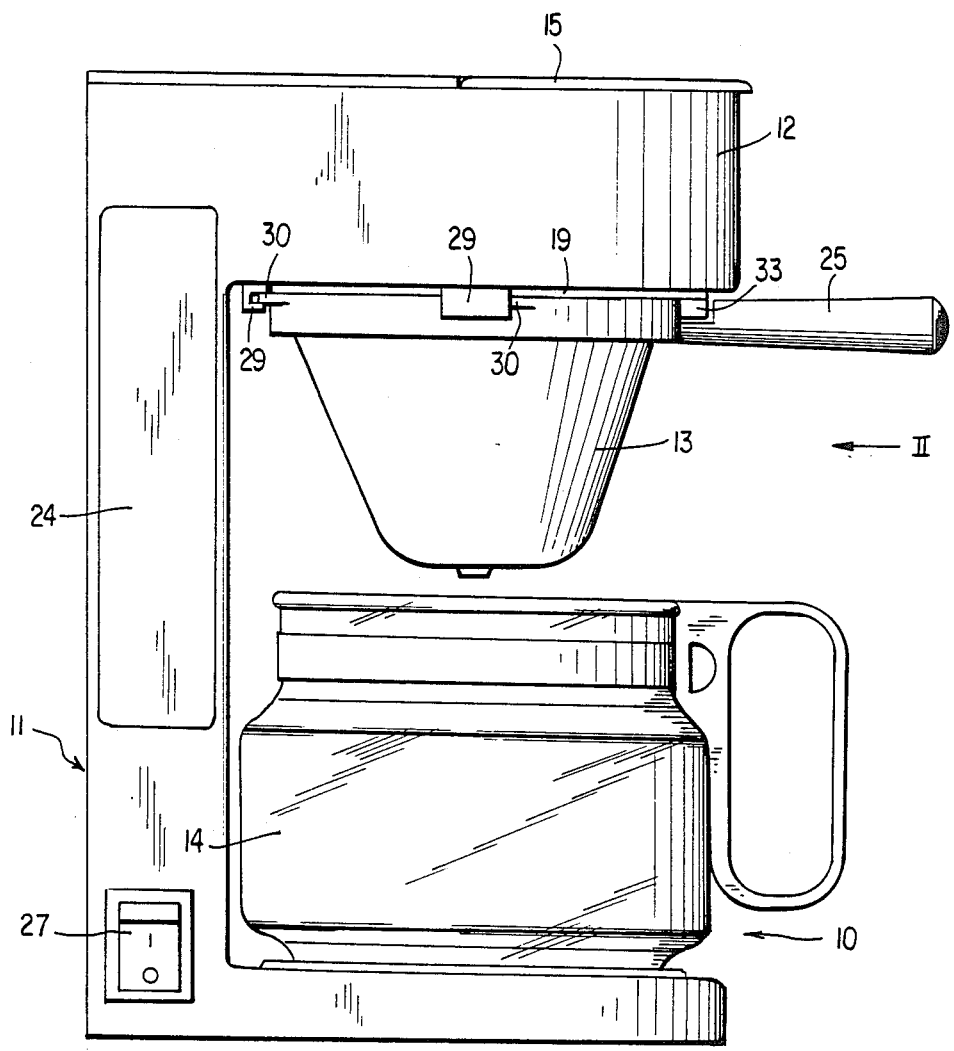
FIG. 1 is a side view of a coffee maker according to the invention.
Figure 2:
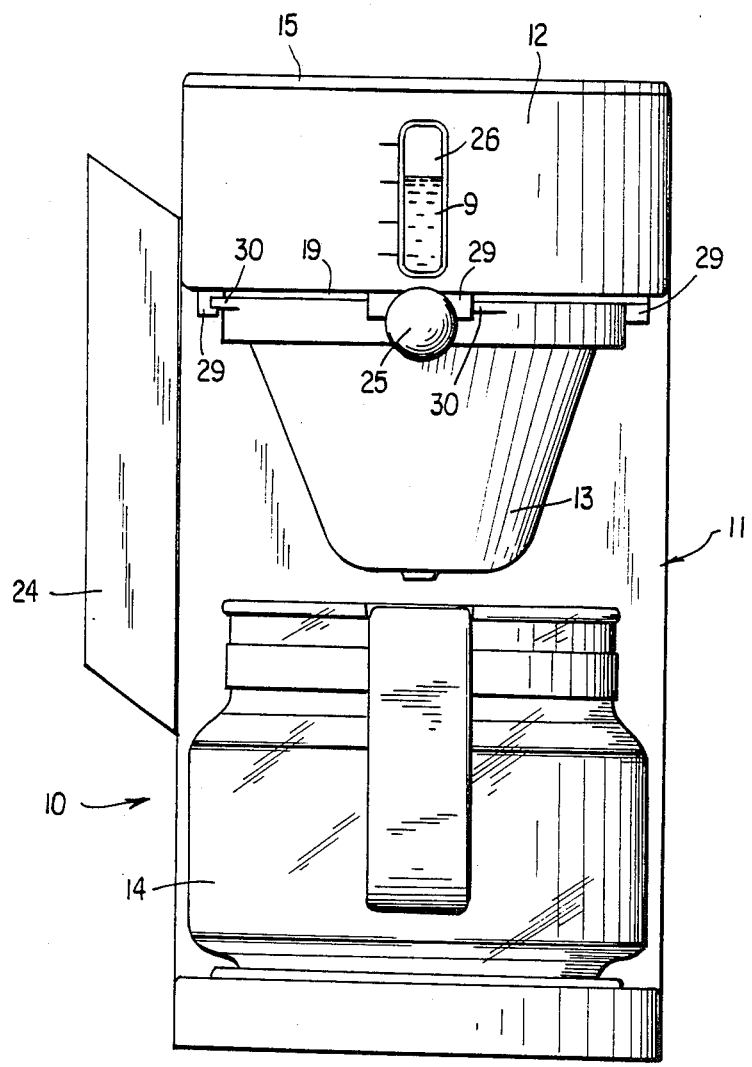
FIG. 2 is a view of the coffee maker in the direction of arrow II in FIG. 1.

The coffee maker shown in FIGS. 1 and 2 and marked as a whole with the reference numeral 10 is essentially composed of an approximately L-shaped housing 11, a container 12 attached at the upper end of the vertical arm of housing 11 for receiving water 9, a filter vessel 13 disposed below fresh water container 12 and tightly but releasably joined therewith by a bayonet-type lock which will be described subsequently, and a receptacle 14 for the filtered coffee seated on the horizontal, lower arm of housing 11 and disposed immediately below filter vessel 13. Since housing 11 does not accommodate a flow-type heater, the vertical arm of housing 11 performs only a supporting function and can be provided with a door 24 to a fold-out compartment for storing filter papers. Reference number 27 identifies an ON/OFF switch.

Figure 3:
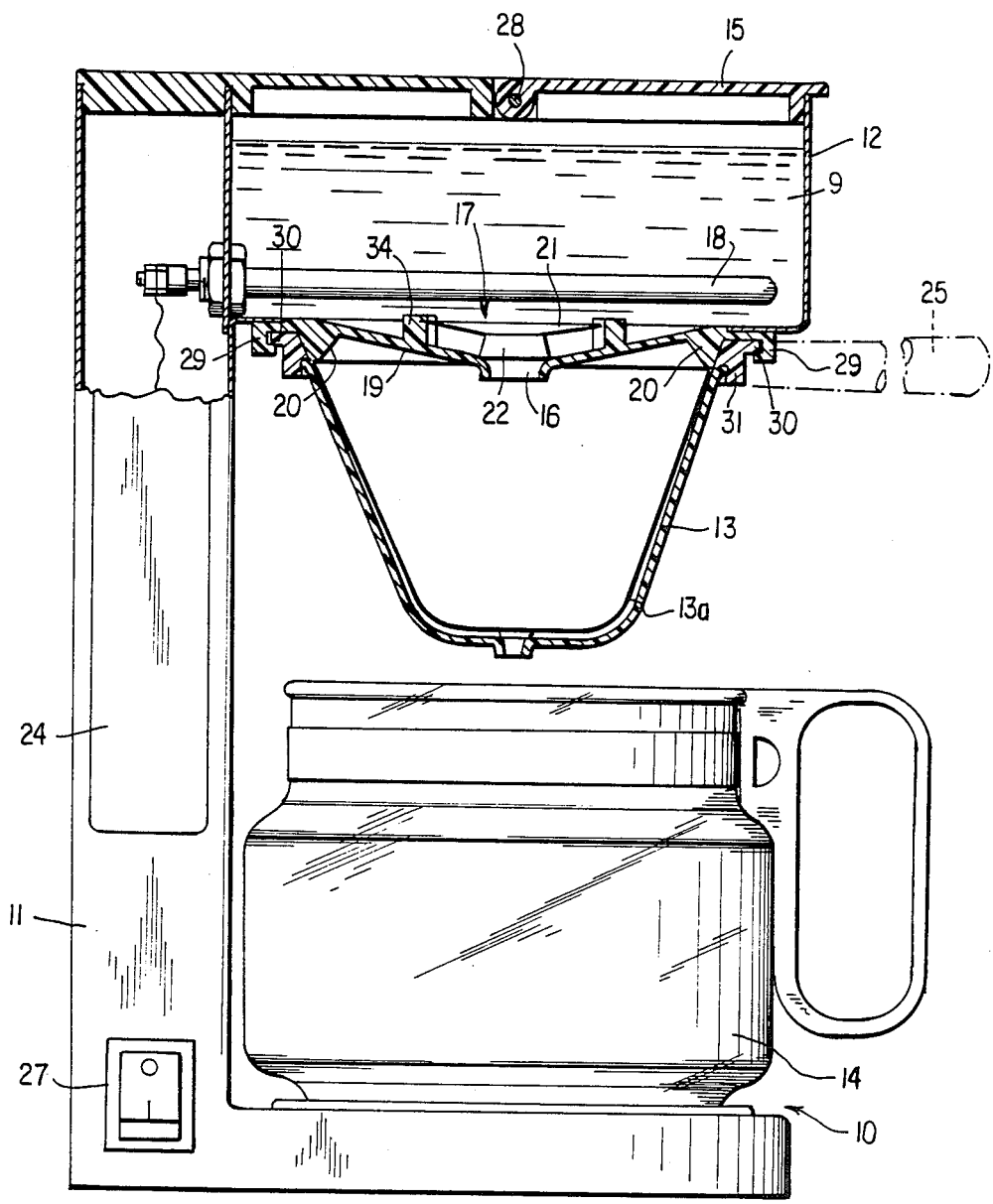
FIG. 3 is a side view of the coffee maker corresponding to FIG. 1, and includes a sectional view of the fresh water container, filter vessel, and part of the housing, depicted with the fresh water container filled with water and with the outlet closed.
Figure 5:
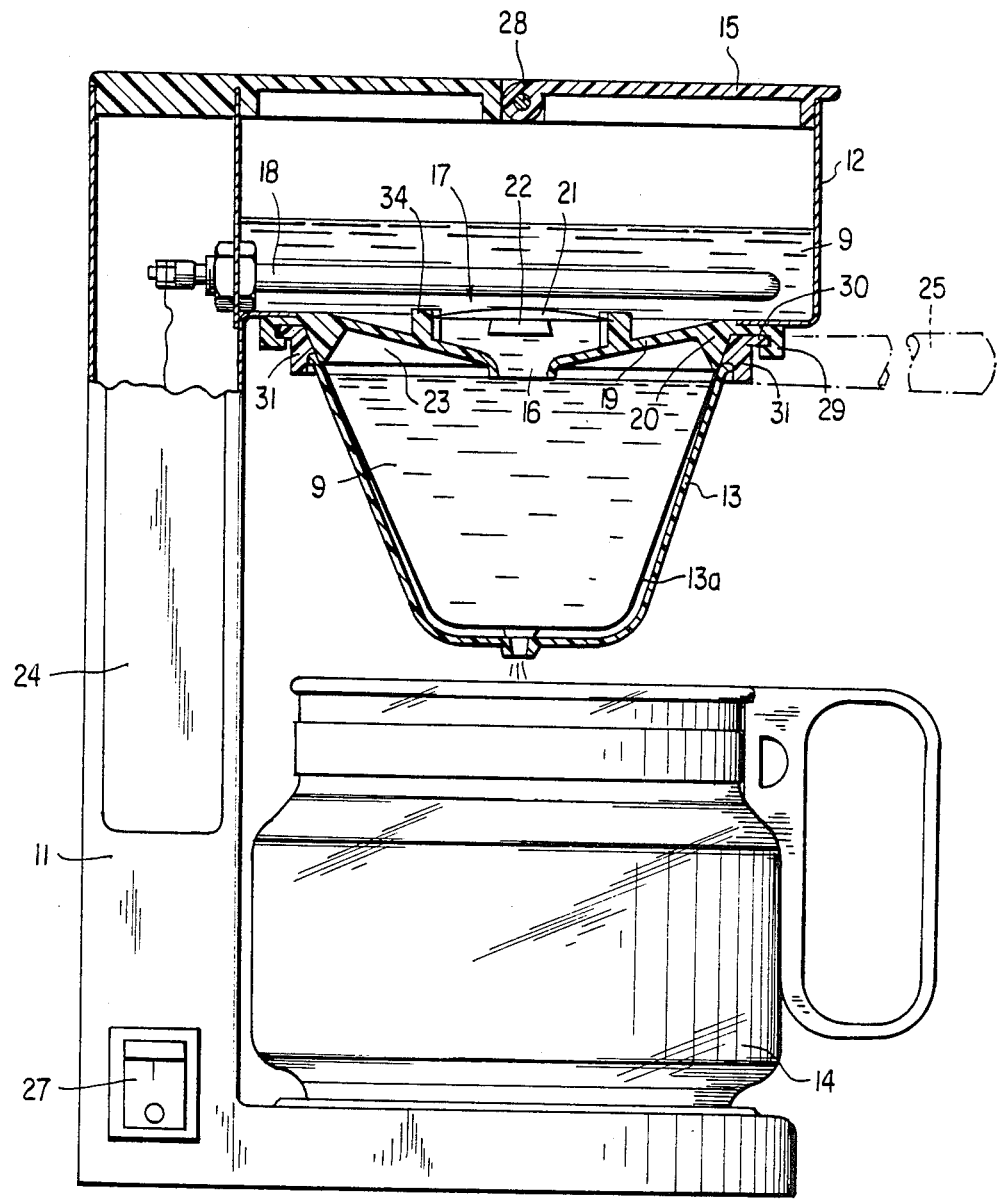
FIG. 5 is a side view of the coffee maker corresponding to that of FIG. 3, shown partially in section, and illustrates the outlet of the fresh water container open and the filter vessel completely filled with brewing water.

FIG. 3 to 5 show the configuration and operation of fresh water container 12 and filter vessel 13. In these Figures, the upper side of fresh water container 12 is provided with a fold-away cover 15 which is hinged at 28. After cover 15 has been opened, fresh water container 12 can be filled with fresh water. The bottom of container 12 is provided by a bottom element 19 having an outlet 16 which is initially closed by a movable closing member 17 (which will be discussed in greater detail subsequently). A heating assembly such as heating rod 18 is disposed within container 12. Heating rod 12 may be controlled thermostatically, so that it is switched ON only if the temperature is below a predetermined level. Instead of a rod 18, however, a heating coil could alternatively be disposed in container 12, or a plurality of heating rods or heating coils.

With continuing reference to FIGS. 3 to 5, bottom element 19 of fresh water container 12 has an approximately conical shape, with the tip of the cone pointing downwardly. Outlet 16 is provided in the region of the lowest section of element 19, and an annular sealing shoulder 20 is provided outward of outlet 16.

As has previously been mentioned filter vessel 13 is releasably connected with fresh water container 12 by a bayonet-type lock, and to this end a plurality of bayonet sockets 29 are provided at the periphery of bottom element 19 to engage bayonet tongues 30 extending from annular rim 31 of filter vessel 13. Each socket 29 includes a slot 32 which is closed by a wall 33 at one end and which is open at the other end to receive a tongue 30 (see FIG. 6). Filter vessel 13 is connected to bottom element 19 by aligning the tongues 30 with the openings in sockets 29 and then rotating vessel 13 slightly via removable handle 25 to advance the tongues 30 into the sockets 29. This presses rim 31 toward shoulder 20 and thereby creates a seal between shoulder 20 and rim 31. A filter paper 13a is accommodated in the filter vessel 13, and the upper rim of filter paper 13a may be clamped in the sealing area between shoulder 20 of fresh water container 12 and rim 31 of filter vessel 13.

In the illustrated embodiment, the above-mentioned closing member 17 is composed of a bimetallic snap disk 21, which is affixed to legs 34 which extend upwardly from bottom element 19, and a sealing stopper 22 connected to disc 21. Disc 21 is made of metals which are joined together and which have different thermal coefficients of expansion, so that the disc 21 snaps upward when the water in container 12 is hot enough for making coffee. In the closed state, stopper 22 is urged against the edge of outlet 16 and thus closes outlet 16.

The above described novel coffee maker operates as follows.

After fresh water container 12 has been filled with fresh water and heating rod 18 has been switched ON, the initially cold fresh water is heated to a temperature of about 95° C. As soon as the response threshold of bimetal snap disc 21 has been reached, the latter snaps out of the closed position shown in FIG. 3 into the open position shown in FIGS. 4 and 5. FIGS 4 and 5 show clearly that, after the change in position of bimetal snap disc 21, outlet 16 of fresh water container 12 is open. The heated water can now flow to the coffee grounds 35 in filter vessel 13 in a relatively short time, which is determined by the height of the water in container 12 and the cross-sectional size of opening 16.

As soon as filter vessel 13 is filled completely with brewing water, fresh water container 12 and filter vessel 13 in practice form a common, large vessel in which all of the filled-in water is disposed.

As is clearly shown particularly in FIG. 5, even after filter vessel 13 is completely filled, the water is still within the range of heating rod 18, which continues to be switched on. This means that the water is constantly kept at brewing temperature. Heating rod 18 is switched off only if a given desired temperature is exceeded or if the level of the water has dropped to such an extent that heating rod 18 is no longer immersed in water.

FIG. 5 shows that, due to the frustoconical configuration of bottom element 19 of fresh water container 12, the water in filter vessel 13 rises only to the lower lip of outlet 16 and an annular chamber 23 which is not occupied by the brewing water is created in the transition region between fresh water container 12 and filter vessel 13. Due to the seal between shoulder 20 and rim 31 an air bubble forms in this annular chamber 23. The advantage of keeping chamber 23 free of water is that it is in practice impossible for the underside of bottom element 19 to become soiled.

In modification of the embodiment illustrated in the drawing figures, closing member 17 may also be configured as a mechanically movable closing member which can be operated manually. A manually operated closing member, however, does not offer the convenience of the bimetallic snap disk 21 with stopper 22, as provided in the illustrated embodiment. A water level indicator 26 (see FIG. 2) may be provided if container 12 is opague.

The present disclosure relates to the subject matter disclosed in Ser. No. G 85 35 291.8, filed Dec. 14, 1986 in the Federal Republic of Germany, the entire specification of which is incorporated herein by reference.

It will be understood that the above description of the present invention is susceptible to various modifications, changes and adaptations, and the same are intended to be comprehended within the meaning and range of equivalents of the appended claims.

What I claim is:

1. An apparatus for making coffee and delivering it to a coffee receptacle, comprising:
   a fresh water container having an outlet;
   a movable closing member for the outlet;
   a heating assembly disposed in the container;
   a filter vessel disposed above the receptacle to accommodate coffee grounds and release brewed coffee to the receptacle; and
   means for releasably connecting the filter vessel to the container at a connection region so that the filter vessel is disposed below the container and is sealed to the container at the connection region, and
   wherein the container comprises a bottom element having a downwardly descending and approximately conical portion, the outlet of the container being provided in the lowest region of the approximately conical portion, the bottom element having a periphery and the filter vessel having an upper rim, and wherein the means for releasably connecting comprises a sealing shoulder affixed to the bottom element adjacent the periphery thereof, and means for urging the upper rim toward the sealing shoulder.

2. The apparatus of claim 1, wherein the means for urging the upper rim toward the sealing shoulder comprises means for attaching the filter vessel to the container by way of a bayonet lock.

3. An apparatus for making coffee and delivering it to a coffee receptacle, comprising:
   a fresh water container having an outlet;
   a movable closing member for the outlet;
   a heating assembly disposed in the container;
   a filter vessel disposed above the receptacle to accommodate coffee grounds and release brewed coffee to the receptacle; and
   means for releasably connecting the filter vessel to the container at a connection region so that the filter vessel is disposed below the container and is sealed to the container at the connection region, and
   wherein the filter vessel has an upper rim, wherein the container comprises a bottom element having a periphery and a downwardly descending portion, the outlet of the container being provided in the downwardly descending portion, and wherein the means for releasably connecting comprises a sealing shoulder affixed to the bottom element adjacent the periphery thereof, and means for urging the upper rim toward the sealing shoulder.

4. The apparatus of claim 3, wherein the means for urging the upper rim toward the sealing shoulder comprises means for attaching the filter vessel to the container by way of a bayonet lock.

5. The apparatus of claim 4, wherein the closing member comprises a bimetallic snap disc.

6. The apparatus of claim 5, wherein the closing member further comprises a stopper element of an elastic material, the stopper element being fastened to the disc.

7. The apparatus of claim 3, wherein the closing member comprises a bimetallic snap disc.

8. The apparatus of claim 7, wherein the closing member further comprises a stopper element of an elastic material, the stopper element being fastened to the disc.

9. An apparatus for making coffee and delivering it to a coffee receptacle, comprising:
   a fresh water container having an outlet;
   a movable closing member for the outlet;
   a heating assembly disposed in the container;
   a filter vessel disposed above the receptacle to accommodate coffee grounds and release brewed coffee to the receptacle; and
   means for releasably connecting the filter vessel to the container at a connection region so that the filter vessel is disposed below the container and is sealed to the container at the connection region, and
   wherein the closing member comprises a bimetallic snap disc.

10. The apparatus of claim 9, wherein the closing member further comprises a stopper element of an elastic material, the stopper element being fastened to the disc.

11. An apparatus for making coffee and delivering it to a coffee receptacle, comprising:
    a fresh water container having an outlet;
    a movable closing member for the outlet;
    a heating assembly disposed in the container;
    a filter vessel disposed above the receptacle to accommodate coffee grounds and release brewed coffee to the receptacle; and
    means for releasably connecting the filter vessel to the container at a connection region so that the filter vessel is disposed below the container and is sealed to the container at the connection region; and
    a substantially L-shaped housing having a vertical arm, the water container being supported on the vertical arm, the vertical arm having a fold-away compartment therein.

12. An apparatus for making coffee and delivering it to a coffee receptacle, comprising
    a housing having a base portion to support the coffee receptacle and having an upstanding arm;
    a fresh water container mounted on the upstanding arm above the base portion, the container having a bottom element with a periphery and upper and lower sides, the bottom element having
        a centrally disposed portion which slopes downwardly and has an outlet therein,
        at least one upstanding support on the upper side adjacent the outlet opening,
        an annular sealing shoulder on the lower side adjacent the periphery, the sealing shoulder having a conical outer surface, and
        a plurality of spaced apart bayonet sockets at the periphery;
    at least one resistive heating element in the container;
    means mounted on the at least one upstanding support of the bottom element for closing the outlet until the at least one heating element heats water in the container to a predetermined temperature; and
    a filter vessel to hold coffee grounds, the filter vessel having a bottom opening to release brewed coffee to the coffee receptacle, an annular upper rim with a conical inside surface, and a plurality of outwardly extending bayonet tongues disposed at spaced apart positions at the upper rim to releasably support the filter vessel on the bayonet sockets and create a seal between the filter vessel and the bottom element of the container by pressing the conical inside surface of the rim toward the conical outer surface of the sealing shoulder.

13. The apparatus of claim 12, wherein the means for closing the outlet comprises a temperature-sensitive bimetallic snap element mounted above the outlet by the at least one upstanding support, and a resilient stopper element mounted on the snap element.

* * * * *